(12) United States Patent
Decarreau et al.

(10) Patent No.: US 10,575,236 B2
(45) Date of Patent: Feb. 25, 2020

(54) METHODS AND APPARATUS FOR CONTROL OF COVERAGE EXTENSION TECHNIQUES FOR ACCESS TO PROSPECTIVE SERVING CELLS

(71) Applicant: Nokia Solutions and Networks Oy, Espoo (FI)

(72) Inventors: Guillaume Decarreau, Beijing (CN); Benoist Pierre Sebire, Tokyo (JP); Woonhee Hwang, Espoo (FI); Rapeepat Ratasuk, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 246 days.

(21) Appl. No.: 14/220,491

(22) Filed: Mar. 20, 2014

(65) Prior Publication Data

US 2015/0271736 A1 Sep. 24, 2015

(51) Int. Cl.
*H04W 4/70* (2018.01)
*H04W 48/16* (2009.01)
*H04W 40/22* (2009.01)
*H04W 48/18* (2009.01)
*H04B 7/26* (2006.01)
*H04W 16/24* (2009.01)

(52) U.S. Cl.
CPC ............ *H04W 40/22* (2013.01); *H04W 4/70* (2018.02); *H04W 48/16* (2013.01); *H04B 7/2606* (2013.01); *H04W 16/24* (2013.01); *H04W 48/18* (2013.01)

(58) Field of Classification Search
CPC ....... H04W 40/22; H04W 4/70; H04W 48/16; H04W 16/24; H04W 48/18; H04W 52/50; H04B 7/2606

USPC .......................................................... 455/434
See application file for complete search history.

(56) References Cited

U.S. PATENT DOCUMENTS

2014/0098761 A1\* 4/2014 Lee et al. ...................... 370/329

FOREIGN PATENT DOCUMENTS

| CN | 101262691 A | 9/2008 |
| WO | WO-2013/033907 A1 | 3/2013 |
| WO | WO-2013172655 A1 | 11/2013 |

OTHER PUBLICATIONS

3GPP TSG-RAN WG2 Meeting #85 R2-140825, Prague, Czech Republic, Feb. 10-14, 2014, made publicly available online Feb. 8, 2014, authored by Sony.\*

(Continued)

*Primary Examiner* — Rafael Pérez-Gutiérrez
*Assistant Examiner* — Mark G. Pannell
(74) *Attorney, Agent, or Firm* — Harrington & Smith (57) ABSTRACT

Improved mechanisms for wireless cellular access using coverage extension techniques are described. A UE needing to use coverage extension to request access to a prospective serving cell detects cells (other than the prospective serving cell) on its frequency, and then investigates each such cell (for example, by attempting to read its system information block and, if the system information block can be read, determining if the cell supports access using coverage extension. If detected cells do not support coverage extension, the UE does not use coverage extension techniques to request access, but if all detected cells support coverage extension, the UE requests access using coverage extension techniques.

19 Claims, 3 Drawing Sheets

(56) References Cited

OTHER PUBLICATIONS

Rogers to Debut 'Extended Coverage' via Roaming Agreements to Boost Poor Signals by István Fekete on Tuesday, Jan. 6, 2015, iPhone in Canada, http://www.iphoneincanada.ca/carriers/rogers-fido-extended-coverage/.*
Directory listing of http://www.3gpp.org/ftp/tsg_ran/WG2_RL2/TSGR2_85/Docs/ (to evidence the date for document U).*
3GPP TS 36.304 V11.6.0 (Dec. 2013), Technical Specification, 3rd Generation Partnership Project; Technical Specification Group Radio Access Network; Evolved Universal Terrestrial Radio Access (E-UTRA); User Equipment (UE) procedures in idle mode; (Release 11), (34 pages).
3GPP TS 36.331 V12.0.0 (Dec. 2013), Technical Specification, 3rd Generation Partnership Project; Technical Specification Group Radio Access Network; Evolved Universal Terrestrial Radio Access (E-UTRA); Radio Resource Control (RRC); Protocol specification; (Release 12); (349 pages).
Sony: R2-140825; Enhanced Coverage Issues; 3GPP Draft TSG-RAN WG2 Meeting #85, Prague, Czech Republic, Feb. 10-14, 2014, vol. RAN WG2, Feb. 8, 2014, XP050754559, Retrieved from the Internet: URL:http://www.3gpp.org/ftp/tsg_ran/WG2_RL2/TSGR2_85/Docs/ [retrieved on Feb. 8, 2014] paragraphs [02.2]-[02.3].
NSN et al: R2-140063; Coverage enhancements analysis for low cost MTC UEs; 3GPP Draft TSG-RAN WG2 Meeting #85, Prague, Czech Republic, Feb. 10-14, 2014, vol. RAN WG2, Feb. 9, 2014, XP050791499, Retrieved from the Internet: URL:http://www.3gpp.org/ftp/Meetings_3GPP_SYNC/RAN2/Docs/ [retrieved on Feb. 9, 2014] paragraph [02.4].
Alcatel-Lucent Shanghai Bell: R2-140725; SIB transmission for coverage extension MTC UEs; 3GPP Draft TSG-WG RAN2#84, Prague, Czech Republic, Feb. 10-14, 2014, vol. RAN WG2, no. Prague, Czech Republic; Feb. 9, 2014, XP050792015, Retrieved from the Internet: URL:http://www.3gpp.org/ftp/Meetings_3GPP_SYNC/RAN2/Docs/ [retrieved on Feb. 9, 2014] paragraph [02.4].
"Enhanced Coverage Issues" 3GPP TSG-RANWG2 Meeting #85, R2-140825 (published on Feb. 10, 2014).
SIB Transmission for Coverage Extension MTC UE's, 3GPP TSG-WGRAN#284, R2-140725 (published on Feb. 10, 2014).

* cited by examiner

METHODS AND APPARATUS FOR CONTROL OF COVERAGE EXTENSION TECHNIQUES FOR ACCESS TO PROSPECTIVE SERVING CELLS

CROSS-REFERENCE TO RELATED APPLICATIONS

Technical Field

The present invention relates generally to wireless communication. More particularly, the invention relates to improved systems and techniques for management extended coverage capabilities of cellular network nodes so as to avoid undue interference to nodes incapable of extended coverage.

BACKGROUND

Wireless networks are ubiquitous in many countries, with numerous devices operated in numerous cells. Cells may be thought of as coverage areas served by a base station or a combination of base stations that may be operating in coordination with one another. A cell may serve devices that are directly operated by users to communicate with other users and to receive and transfer data. A cell may also support machine type communication (MTC) devices. Such devices are often designed to be low cost, low power devices and may exist in large numbers. MTC devices may be dormant for long periods and may become active in order to deliver information about natural phenomena such as weather, and a low-power, low-cost design makes it easier to deploy as many such devices as may be desired.

In order to reduce costs, low-cost MTC devices may be designed to have only one receive antenna. Such a design contrasts to many other devices having at least two antennas. Many examples of such devices are operated according to third generation partnership project (3GPP) standards and extension such as long term evolution (LTE) and LTE-advanced (LTE-A). The use of only one receive antenna in an MTC device will reduce the range in the downlink of the device. Furthermore, it is desirable to extend LTE coverage into locations which may exhibit poor radio conditions in locations where MTC devices might be installed—for example, in the basement of a building. Therefore, for 3GPP and 3GPP LTE and LTE-A devices, techniques have been defined to allow for extended coverage. To gain initial access, an MTC device (known as an MTC user equipment or UE) to transmit on a random access channel RACH of a cell. The cell may be represented as a base station or eNodeB (eNB). The initial transmission is of a physical random access preamble. For extended coverage initial access, the MTC UE transmits a (PRACH) and may transmit a PRACH preamble at high power for a long time (up to hundreds of subframes) before it finally gains access.

SUMMARY OF THE INVENTION

In one embodiment of the invention, an apparatus comprises at least one processor and memory storing a program of instructions. The memory storing the program of instructions is configured to, with the at least one processor, cause the apparatus to at least control a user device needing to gain access to a prospective serving cell to detect one or more additional cells within range, control the user device to, for each detected cell, attempt to establish whether the detected cell supports coverage extension access and control the user device to, if one or more of the detected cells does not support coverage extension access, refrain from attempting access to the prospective serving cell using coverage extension techniques.

In another embodiment of the invention, a method comprises controlling a user device needing to gain access to a prospective serving cell to detect one or more additional cells within range, controlling the user device to, for each detected cell, attempt to establish whether the detected cell supports coverage extension access and controlling the user device to, if one or more of the detected cells does not support coverage extension access, refrain from attempting access to the prospective serving cell using coverage extension techniques.

In another embodiment of the invention, a computer readable medium stores a program of instructions. Execution of the program of instructions by at least one processor configures an apparatus to at least control a user device needing to gain access to a prospective serving cell to detect one or more additional cells within range, control the user device to, for each detected cell, attempt to establish whether the detected cell supports coverage extension access and control the user device to, if one or more of the detected cells does not support coverage extension access, refrain from attempting access to the prospective serving cell using coverage extension techniques.

DETAILED DESCRIPTION

One or more embodiments of the present invention recognize the possibility of interference presented by MTC UEs seeking using coverage extension techniques to gain access to a cell supporting such techniques. Adjacent cells or cells otherwise within range of the MTC UE, or at least sufficiently close to be within range of interference, can suffer significant interference from extended coverage access attempts if they themselves are not able to support extended coverage access. Therefore, embodiments of the present invention address techniques to manage their use of coverage extension techniques to avoid such interference.

Figure 1:
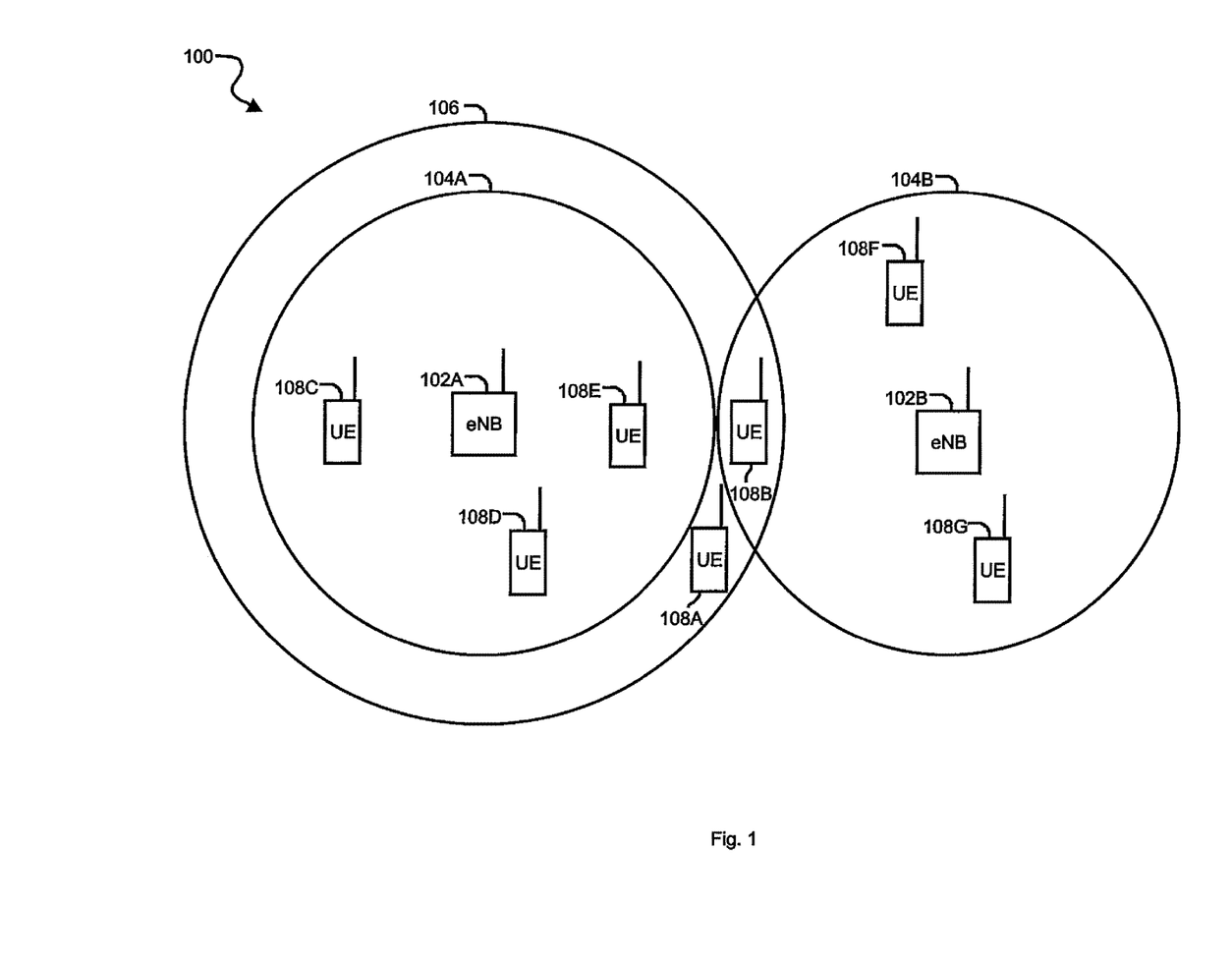
FIG. 1 illustrates a cellular network according to an embodiment of the present invention.

FIG. 1 illustrates a wireless network 100 according to an embodiment of the present invention. The network 100 comprises eNBs 102A and 102B, whose coverage areas define cells 104A and 104B. The cell 104A also includes an extended coverage area 106.

The cells 104A and 104B support a number of UEs 108A-108G, some of which (including the UEs 108A and 108B) are capable of coverage extension operation. The UE 108A is outside the coverage area of the cell 104B but is near its boundary, while the UE 108B is within the area of the cell 104B, but is seeking access to the cell 104A at a position in which the extended coverage area 106 of the cell 104A overlaps with the cell 104A. Extended coverage operation of both of the devices 108A and 108B will cause a risk of interference with the cell 104B.

Therefore, one or more embodiments of the invention implement mechanisms to prevent a UE from attempting to initiate access to a particular cell using coverage extension operation when such operation presents a risk of excessive interference with a neighboring cell. A cell may be selected as a prospective serving cell (a "prospective" cell being one for which access is to be attempted, but for which access has not yet been initiated or has not yet been completed) according to predetermined criteria. For example, a UE may attempt to detect a cell for access by looking for physical cell indicators (PCIs). If only one cell is detected, that cell may suitably selected as the prosepctive serving cell. If more than one cell is detected, a decision may be made based on appropriate criteria. For example, the cell exhibiting the most power (manifested, for example, by reference signal received power (RSRP) may be selected.

Therefore, a coverage extension capable UE (such as the UEs 108A and 108B) takes steps to identify cells neighboring a prospective serving cell and determine if any of the neighboring cells using its frequency support coverage extension access. If the UE determines that one or more cells using the frequency to be used by the UE to gain access does not support coverage extension (for example, by reading the master information blocks (MIBs) or system information blocks (SIBs) of detected cells and, if the MIB or SIB for a cell can be read, determining based at least in part on information provided by the MIB or SIB whether the cell supports coverage extension, the UE may refrain from coverage extension access. In one or more embodiments of the invention, the UE similarly refrains from coverage extension access if it cannot positively determine that a detected eNB supports coverage extension access. In such embodiments, if the UE does not know the capabilities of cell, it will not attempt coverage extension access.

Figure 2:
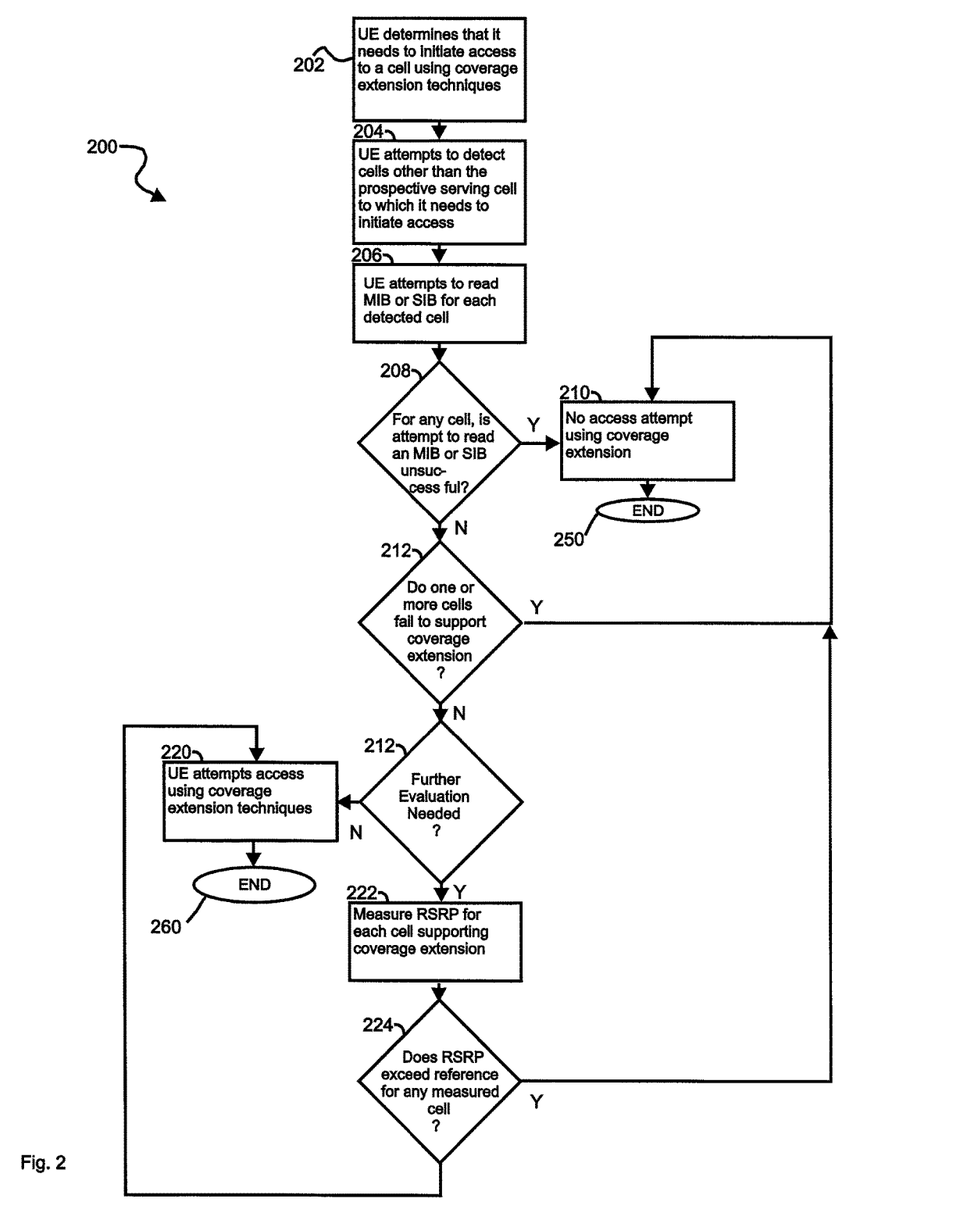
FIG. 2 illustrates a process according to an embodiment of the present invention.

FIG. 2 illustrates a process 200 according to an embodiment of the present invention. The process 200 is presented here as blocks which, it will be understood, may be implemented as method steps and which may be implemented at least in part through the actions of a processor under the control of computer software. Except where specified, the blocks need not be performed in sequence.

At block 202, a UE capable of coverage extension access determines that it needs to initiate access to a cell using coverage extension techniques. At block 204, the UE attempts to detect cells other than the serving cell to which it is to attempt access, with the cells being manifested as eNBs. The attempt to detect cells is made whether or not the cells meet the criteria for an access attempt. One exemplary criterion for detection of a cell may be the ability by the UE to read the physical cell identifier (PCI) of the cell.

At block 206, the UE attempts to read the system information block (SIB) for each of the detected cells (other than the desired serving cell). At block 208, the UE determines for each cell whether the attempt to read the MIB or SIB has been successful. If, for any cell, successful reading of the MIB or SIB has not been accomplished, the process proceeds to block 210 and the UE refrains from attempting coverage extension access. The process then terminates at block 250. If the MIB or SIB for each cell has been read successfully, the process proceeds to block 212, and the UE attempts to determine (for example, by examining information provided by the MIB or SIB whether any of the cells do not support coverage extension. If any cell is determined not to support coverage extension, the process proceeds to block 210, and, as above, the UE refrains from attempting access using coverage extension and the process goes on to terminate at block 250. If all cells are determined to support coverage extension and no further evaluation is to be made, the process proceeds to block 220 and the UE proceeds to use coverage extension techniques to attempt access, with the process then terminating at block 260.

Depending on design choice, however, a further evaluation may be made, in which power characteristics of the detected cells are compared against (for example) a threshold or against power characteristics of the cell to which access is to be attempted. In such a case, the process proceeds to block 222 and the UE measures the reference signal received power (RSRP) of each detected cell. At block 224, the UE evaluates the RSRP for each cell, comparing the RSRP for the cell against a reference. The reference may be a predetermined threshold, or may be the RSRP of the prospective serving cell, diminished by an offset. The evaluation determines whether the RSRP of a detected cell is greater than the reference. If the measured power of a cell (as manifested by the RSRP) is greater than the reference, this indicates that there is sufficient overlap between signaling between the cell and the UE that the UE presents a risk of interference to the cell. If the measured RSRP of any cell is greater than the reference, the process returns to block 210 and the UE does not attempt access using coverage extension techniques. If no detected cell exhibits a measured RSRP greater than the reference, the process returns to block 220 and the UE attempts access using coverage extension techniques, with the process terminating at block 260.

Figure 3:
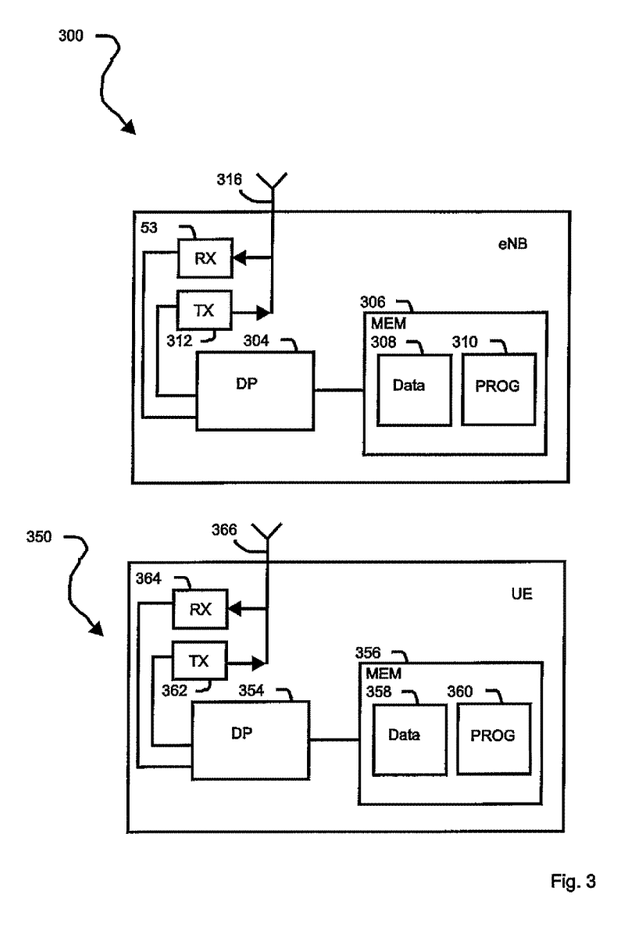
FIG. 3 illustrates exemplary elements that may be used in carrying out embodiments of the present invention.

Reference is now made to FIG. 3 for illustrating a simplified block diagram of a base station, such as an eNB 300, and a user device, such as a UE 350, suitable for use in practicing the exemplary embodiments of this invention. In FIG. 3 an apparatus, such as the eNB 300, is adapted for communication with other apparatuses having wireless communication capability, such as the UE 350.

The eNB 300 includes processing means such as at least one data processor (DP) 302, storing means such as at least one computer-readable memory (MEM) 304 storing data 306 and at least one computer program (PROG) 308 or other set of executable instructions, communicating means such as a transmitter TX 310 and a receiver RX 312 for bidirectional wireless communications with the UE 350 via one or more antennas 314.

The UE 350 includes processing means such as at least one data processor (DP) 352, storing means such as at least one computer-readable memory (MEM) 354 storing data 356 and at least one computer program (PROG) 358 or other set of executable instructions, communicating means such as a transmitter TX 360 and a receiver RX 362 for bidirectional wireless communications with the eNB 300 via one or more antennas 364.

At least one of the PROGs 308 in the eNB 300 is assumed to include a set of program instructions that, when executed by the associated DP 302, enable the device to operate in accordance with the exemplary embodiments of this invention, as detailed above. In these regards the exemplary embodiments of this invention may be implemented at least in part by computer software stored on the MEM 304, which is executable by the DP 302 of the eNB 300, or by hardware, or by a combination of tangibly stored software and hardware (and tangibly stored firmware).

Similarly, at least one of the PROGs 358 in the UE 350 is assumed to include a set of program instructions that, when executed by the associated DP 352, enable the device to operate in accordance with the exemplary embodiments of this invention, as detailed above. In these regards the exemplary embodiments of this invention may be implemented at least in part by computer software stored on the MEM 354, which is executable by the DP 352 of the UE 350, or by hardware, or by a combination of tangibly stored software and hardware (and tangibly stored firmware). Electronic devices implementing these aspects of the invention need not be the entire devices as depicted at FIG. 1 or 3 or may be one or more components of same such as the above described tangibly stored software, hardware, firmware and DP, or a system on a chip SOC or an application specific integrated circuit ASIC.

In general, the various embodiments of the UE 350 can include, but are not limited to personal portable digital devices having wireless communication capabilities, including but not limited to cellular telephones, navigation devices, laptop/palmtop/tablet computers, digital cameras and music devices, and Internet appliances.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   at least one non-transitory memory storing a program of instructions, wherein the memory storing the program of instructions is configured to, with the at least one processor, cause the apparatus to at least:
     control a cellular capable user device, needing to gain access to a prospective serving cell, to detect one or more additional cells within range;
     control the user device to, for each of the detected one or more additional cells, attempt to obtain information establishing that the detected one or more additional cells supports coverage extension techniques for access; and
     control the user device to, with respect to the detected one or more additional cells, in response to inability to obtain the information establishing that the detected one or more additional cells supports coverage extension techniques for access, refrain from using coverage extension techniques to attempt access to the prospective serving cell;
   wherein the use of coverage extension techniques for access comprises at least one of:
     transmitting a preamble on a random access channel, wherein the transmitting of the preamble is at higher power than in a mode not using coverage extension techniques; or
     transmitting the preamble for a longer time than in a mode not using coverage extension techniques.

2. The apparatus of claim 1, wherein attempting to obtain information establishing that a detected cell supports coverage extension techniques for access comprises attempting to read the master or system information block of the detected cell.

3. The apparatus of claim 2, wherein the memory storing the program of instructions is further configured to, with the at least one processor, cause the apparatus to control the user device to, in response to failure to read the master or system information block of the detected one or more additional cells, refrain from attempting access to the prospective serving cell using coverage extension techniques.

4. The apparatus of claim 2, wherein the memory storing the program of instructions is further configured to, with the at least one processor, cause the apparatus to control the user device to, upon successfully reading the master or system information block of each detected one or more additional cells, attempt to determine, for each detected one or more additional cells, if the detected one or more additional cells supports coverage extension techniques for access and, if each detected one or more additional cells supports coverage extension techniques for access, attempt access to the prospective serving cell using coverage extension techniques.

5. The apparatus of claim 1, wherein the memory storing the program of instructions is further configured to, with the at least one processor, cause the apparatus to control the user device to, if each detected one or more additional cells supports coverage extension techniques for access:
   measure power characteristics of each detected one or more additional cells;
   evaluate the power characteristics of each detected one or more additional cells against a criterion; and
   if the power characteristics of the detected one or more additional cells do not meet the criterion, refrain from attempting access using coverage extension techniques.

6. The apparatus of claim 5, wherein evaluating the power characteristics of a cell against a criterion comprises comparing the power characteristics against a reference.

7. The apparatus of claim 5, wherein the power characteristics of a cell comprise reference signal received power of the cell and comparing the power characteristics against a reference comprises determining if the reference signal received power exceeds the reference value.

8. The apparatus of claim 7, wherein the reference value is the reference signal received power of the prospective serving cell, adjusted by an offset.

9. The apparatus of claim 7, wherein the reference is a predetermined threshold.

10. The apparatus of claim 1 where the apparatus comprises at least one of the user device or a base station.

11. The apparatus of claim 1 where the apparatus comprises the user device.

12. A method comprising:
   controlling a cellular capable user device, needing to gain access to a prospective serving cell, to detect one or more additional cells within range;
   controlling the user device to, for each detected one or more additional cells, attempt to obtain information establishing that the detected one or more additional cells supports coverage extension techniques for access; and
   controlling the user device to, with respect to the detected one or more additional cells, in response to inability to obtain the information establishing that the detected one or more additional cells supports coverage extension techniques for access, refrain from using coverage extension techniques to attempt access to the prospective serving cell;
   wherein the use of coverage extension techniques for access comprises at least one of:
     transmitting a preamble on a random access channel, wherein the transmitting of the preamble is at higher power than in a mode not using coverage extension techniques; or
     transmitting the preamble for a longer time than in a mode not using coverage extension techniques.

13. The method of claim 12, wherein attempting to obtain information establishing that a detected cell supports coverage extension techniques for access comprises attempting to read the master or system information block of the detected cell.

14. The method of claim 13, further comprising controlling the user device, to, in response to failure to read the system information block of one or more detected cells, refrain from attempting access to the prospective serving cell using coverage extension techniques.

15. The method of claim 13, further comprising controlling the user device to, in response to successfully reading the master or system information block of each detected cell, attempt to determine, for each detected cell, if it supports coverage extension techniques for access and, if each detected cell supports coverage extension techniques for access, attempt access to the prospective serving cell using coverage extension techniques.

16. The method of claim 13, further comprising controlling the user device to, if each detected cell supports coverage extension techniques for access:
measure power characteristics of each detected cell;
evaluate the power characteristics of each detected cell against a criterion; and
if the power characteristics of one or more detected cells do not meet the criterion, refrain from attempting access using coverage extension techniques.

17. The method of claim 16, wherein evaluating the power characteristics of a cell against a criterion comprises comparing the power characteristics against a reference.

18. A non-transitory computer readable medium storing a program of instructions, execution of which by a processor configures an apparatus to at least:
control the apparatus, needing to gain access to a prospective serving cell, to detect one or more cells within range, where the apparatus comprises a cellular capable user device;
control the user device to, for each detected one or more cells, attempt to obtain information establishing that the detected one or more cells supports coverage extension techniques for access; and
control the user device to, with respect to the detected one or more cells, in response to inability to obtain the information establishing that the detected one or more cells supports coverage extension techniques for access, refrain from using coverage extension techniques to attempt access to the prospective serving cell;
wherein the use of coverage extension techniques for access comprises at least one of:
transmitting a preamble on a random access channel, wherein transmission is at higher power than in a mode not using coverage extension techniques; or
transmitting the preamble for a longer time than in a mode not using coverage extension techniques.

19. An apparatus comprising:
at least one processor; and
at least one non-transitory memory storing a program of instructions, where the at least one non-transitory memory and the program of instructions are configured to, with the at least one processor, cause at least:
control the apparatus, when the apparatus desires to gain access to a prospective serving cell, to detect one or more additional cells within range of the apparatus;
control the apparatus, for each of the detected one or more additional cells, to attempt to obtain information for determining if the detected one or more additional cells supports coverage extension techniques for access, where the use of the coverage extension techniques comprises at least one of transmitting a preamble on a random access channel where the transmitting of the preamble is at higher power than in a mode not using the coverage extension techniques, or transmitting the preamble for a longer time than in a mode not using the coverage extension techniques; and
in response to a failure of the apparatus to obtain the information for determining that the detected one or more additional cells supports the coverage extension techniques, control the apparatus to refrain from using the coverage extension techniques to attempt access the prospective serving cell.

* * * * *

UNITED STATES PATENT AND TRADEMARK OFFICE
CERTIFICATE OF CORRECTION

PATENT NO. : 10,575,236 B2
APPLICATION NO. : 14/220491
DATED : February 25, 2020
INVENTOR(S) : Decarreau et al.

It is certified that error appears in the above-identified patent and that said Letters Patent is hereby corrected as shown below:

In the Claims

In Claim 2:
Column 5, Line 60, "a detected cell" should be deleted and --the detected one or more additional cells-- should be inserted.
Column 5, Line 62-63, "the master or system information block of the detected cell" should be deleted and --a master or system information block of the detected one or more additional cells-- should be inserted.
In Claim 6:
Column 6, Line 28, "a cell against a" should be deleted and --each detected one or more additional cells against the-- should be inserted.
In Claim 7:
Column 6, Lines 31-34, "a cell comprise reference signal received power of the cell and comparing the power characteristics against a reference comprises determining if the reference signal received power exceeds the reference value" should be deleted and --each detected one or more additional cells comprise a reference signal of received power of the detected one or more additional cells and the comparing of the power characteristics against the reference comprises determining if the reference signal of received power exceeds a reference value of the reference-- should be inserted.
In Claim 8:
Column 6, Line 36, "signal received" should be deleted and --signal of received-- should be inserted.
In Claim 13:
Column 7, Line 2, "a detected cell" should be deleted and --the detected one or more additional cells-- should be inserted.
Column 7, Lines 4-5, "the master or system information block of the detected cell" should be deleted and --a master or system information block of the detected one or more additional cells-- should be inserted.
In Claim 15:
Column 7, Lines 13-16, "detected cell, attempt to determine, for each detected cell, if it supports coverage extension techniques for access and, if each detected cell" should be deleted and --detected one or more additional cells, attempt to determine, for each detected one or more additional cells, if Signed and Sealed this
Twenty-eighth Day of July, 2020

Andrei Iancu
*Director of the United States Patent and Trademark Office*

CERTIFICATE OF CORRECTION (continued)
U.S. Pat. No. 10,575,236 B2 the detected one or more additional cells supports coverage extension techniques for access and, if each detected one or more additional cells-- should be inserted.

<u>In Claim 16</u>:

Column 7, Line 21, "detected cell" should be deleted and --detected one or more additional cells-- should be inserted.

Column 7, Line 23, "detected cell" should be deleted and --detected one or more additional cells-- should be inserted.

Column 7, Line 24, "detected cell" should be deleted and --detected one or more additional cells-- should be inserted.

Column 7, Line 26, "of one or more detected" should be deleted and --of the detected one or more additional cells-- should be inserted.

<u>In Claim 17</u>:

Column 7, Line 30, "a cell" should be deleted and --the detected one or more additional cells-- should be inserted.